United States Patent
Iwami

(10) Patent No.: US 8,477,783 B2
(45) Date of Patent: *Jul. 2, 2013

(54) WIRELESS COMMUNICATION METHOD AND APPARATUS THEREOF

(75) Inventor: Hideki Iwami, Saitama (JP)

(73) Assignee: Sony Corporation, Tokyo (JP)

( * ) Notice: Subject to any disclaimer, the term of this patent is extended or adjusted under 35 U.S.C. 154(b) by 325 days.

This patent is subject to a terminal disclaimer.

(21) Appl. No.: 12/813,247

(22) Filed: Jun. 10, 2010

(65) Prior Publication Data

US 2010/0246563 A1 Sep. 30, 2010

Related U.S. Application Data

(63) Continuation of application No. 10/868,788, filed on Jun. 17, 2004, now Pat. No. 7,769,012.

(30) Foreign Application Priority Data

Jun. 20, 2003 (JP) ................................. 2003-177284

(51) Int. Cl.
*H04L 12/28* (2006.01)

(52) U.S. Cl. ..................... 370/392; 370/349; 370/395.1; 370/395.4; 370/401; 726/4; 726/13; 726/30

(58) Field of Classification Search .................. 370/349, 370/389, 392, 393, 394, 395.1, 395.4, 395.31, 370/401, 428; 726/4, 5, 13, 14, 30
See application file for complete search history.

(56) References Cited

U.S. PATENT DOCUMENTS

| | | | |
|---|---|---|---|
| 6,130,881 A | 10/2000 | Stiller et al. | |
| 6,188,872 B1 | 2/2001 | Nagira et al. | |
| 6,665,278 B2 | 12/2003 | Grayson | |
| 6,711,678 B2 | 3/2004 | Ferguson | |
| 6,895,432 B2 | 5/2005 | Ando et al. | |
| 7,028,095 B1 | 4/2006 | Foster et al. | |
| 7,159,035 B2 | 1/2007 | Aceves et al. | |
| 7,260,555 B2 | 8/2007 | Rossmann et al. | |
| 7,263,609 B1 | 8/2007 | Wante et al. | |
| 2002/0126667 A1 | 9/2002 | Oguchi | |
| 2003/0142685 A1 | 7/2003 | Bare | |

FOREIGN PATENT DOCUMENTS

| | | |
|---|---|---|
| JP | 8-79827 | 3/1996 |
| JP | 9-8808 | 1/1997 |
| JP | 11-88365 | 3/1999 |
| JP | 2001-501431 | 1/2001 |
| JP | 2002-512479 | 4/2002 |
| JP | 2002-198892 | 7/2002 |
| JP | 2002-271436 | 9/2002 |
| JP | 2003-69581 | 3/2003 |

OTHER PUBLICATIONS

Kinji Oto et al., "Handbook with Pictures for OSI Protocol", Ohmsha Co., Ltd., Dec. 10, 1988. pp. 58-61.

*Primary Examiner* — Dady Chery

(74) *Attorney, Agent, or Firm* — Oblon, Spivak, McClelland, Maier & Neustadt, L.L.P.

(57) ABSTRACT

A wireless communication apparatus includes a header recognition section that recognizes a header included in a packet. The apparatus also includes a packet determining section that determines whether the packet is directed to the wireless communication apparatus itself, and a table to recognize a next transmission destination based on a destination of the packet. The apparatus further includes a relay station packet determining section that determines a packet to be relayed through the table and the header recognition section. The apparatus additionally includes a security table to store security data for a recognition of a communication counterpart. The header recognition section neither transmits the corresponding packet from the wireless communication apparatus nor a reception completion confirmation packet, if the received packet is from a station from which a packet reception is not required as determined by security information included in the received packet and information stored in the security table.

8 Claims, 8 Drawing Sheets

FIG.3

| TRANSMISSION DESTINATION ID | NUMBER | KEY POINTER |
|---|---|---|
| 0 × 01 | 1 | SECOND OF 104 |
| | 2 | THIRD OF 104 |
| | 3 | TENTH OF 108 |
| 0 × 02 | 1 | SIXTH OF 104 |
| | 2 | EIGHTH OF 104 |
| | 3 | TWENTIETH OF 108 |
| | ⋮ | ⋮ |
| 0 × 03 | 1 | TWELFTH OF 104 |
| | 2 | THIRTEENTH OF 108 |
| 0 × 04 | XX | DELETE |

WIRELESS COMMUNICATION METHOD AND APPARATUS THEREOF

CROSS REFERENCE TO RELATED APPLICATIONS

This application is a continuation of U.S. Ser. No. 10/868,788 filed Jun. 17, 2004 which claims priority under 35 U.S.C. 119 to Japanese Application No. 2003-177284 filed Jun. 20, 2003, the entire contents of both which are incorporated herein by reference.

BACKGROUND OF THE INVENTION

1. Field of the Invention

A preferred embodiment of the present invention relates to a wireless communication method useable in application for connecting a plurality of wireless communication networks for transmitting various types of data and a wireless communication apparatus used for the connection to the communication network.

2. Related Art

To access home pages on the Internet, carry out electronic mail data transmission, moving picture transfer and the like, communication means have been realized utilizing a variety of methods of communication, as communication means for providing connection for a terminal apparatuses to execute those data processes. For example, as a relatively high speed communication means, the use of ADSL (Asymmetric Digital Subscriber Line), e cable television, and optical cables have been proposed and actually practiced.

The ADSL is a communication network provided for accessing the Internet by multiplexing digital data on existent analog telephone lines. If a cable television is used, it constitutes a communication network for accessing the Internet using a vacant bandwidth in the cable prepared for cable television sets. An optical cable is a communication network for accessing the Internet using an optical cable line that has been already installed.

There can be a case in which a special terminal apparatus is used for the Internet connection as a terminal apparatus connected to such a communication network in addition to the use of a personal computer. However, in any case, it is a rare case that a communication port capable of connection to these communication networks is directly provided to the terminal apparatus to provide the connection. In general, a port of general-purpose such as USB (Universal Serial Bus) is provided to a communication apparatus to be connected to these communication networks, and is the apparatus is connected to computers via the general port.

Alternatively, those for providing connection between the communication apparatus coupled to a communication network and a computer apparatus or the like are becoming increasingly popular. As a wireless communication network of such kind, for example, a standard called Bluetooth (Bluetooth: trade mark), a standard called IEEE (The Institute of Electrical and Electronics Engineers) 802.11, wireless 1394 and the like have been developed and adopted in practice. In the IEEE802.11 standard, there are various wireless communication standards such as the IEEE 802.11a standard, the IEEE802.11b standard, and the like, depending on the wireless communication method, and the used frequency bandwidth. Further, a standard called UWB (Ultra Wide Band) has been also drawing attention.

SUMMARY OF THE INVENTION

FIG. 7 is a schematic diagram illustrating a structural example including a base station and a terminal station used in such a wireless communication network. This constitutes a structural example of the base station and the terminal that uses the IEEE802.11a standard in a wireless communication network and uses an OFDM (Orthogonal Frequency Division Multiplex) which is a multi-carrier method transmitting a plurality of sub-carriers in one transmission channel. A structure is illustrated in which the terminal station 30 receives the signal transmitted from the base station 10.

The base station 10 is provided with a central control unit (CPU) 11 that executes the control at layers higher than the network layer for the wireless communication. A transmission timing control section 12 is coupled to the central control unit 11. The transmission timing control section (time base controller) 12 executes notifying various processing sections about the type of a data transmission rate and the control of transmission timing based on the control of the central control unit 11. In addition, it can also generate an instruction for changing the data transmission rate. The data transmission rate can be changed, for example, by changing the modulation method or the coding rate.

A memory 13 for storing data inputted from the outside is coupled to the central control unit 11 and supplies the transmission data stored in the memory 13 to a transmission data processing section 14. The transmission data processing section 14 is a circuit for executing the MAC (Media Access Control) processing. More specifically, it processes any data such as non-reversible coded image data including the JPEG (Joint Photographic Experts Group), the MPEG (Moving Picture coding Experts Group) or the like, and reversible coded image data including JBIG (Joint Bi-level Image coding experts Group) or the like as packet type data. Further it may also execute the process of adding error correction codes using Reed Solomon coding or turbo-coding.

Packet data obtained at transmission data processing section 14 is subject to inter-string distance extension at convolution section 15. The transmission-coded bit strings obtained at the convolution section 15 is supplied to an interleaver 16 to interleave the coded bit strings to disperse the bit stings. The dispersed bit strings are supplied to a modulation section 17 to insert a preamble signal into the bit strings, and then, the QPSK (Quadrature Phase Shift Keying) modulation as a primary modulation is carried out. Here, modulation methods such as the BPSK, 8PSK, QAM (regardless of absolute and differential modulations) can be executed other than the QPSK.

The transmission symbol stream modulated by the modulation section 17 is supplied to an inverse fast Fourier transform section 18, which executes an inverse fast Fourier transform process, and further executes a window process. The processing at the inverse fast Fourier transform section 18 averages on time axis the transmission symbol stream imaginarily arranged on a frequency axis.

The transmission symbols obtained by this inverse Fourier transform section 18 is supplied to a digital analog converter 19 to convert it into an analog signal. The converted analog signal is supplied to an RF section 20 to execute analog processes such as filtering, frequency converting or the like to wirelessly transmit the frequency-converted signal through the antenna 21 connected thereto.

The circuits from the transmission data processing section 14 to the RF section 20 are subjected to setting such as the transmission timing and the modulation method in accordance with the instruction from the transmission timing control section 12.

Next, a reception structure of the terminal station 30 will be described. At the terminal station 30, an antenna 31 is coupled to an RF section 32, which executes analog processes such as filtering, frequency conversion or the like of the reception signal. The reception signal processed at the RF section 32 is supplied to an analog/digital converter 33, which converts it into a digital reception symbol steam. The digital reception symbol stream is supplied to a window detection section 34, which executes a synchronous detection process for detecting gaps between pieces of data or frames subjected to be the fast Fourier transform, which is an inverse process of the inverse fast Fourier transform at event of transmission The signal subjected to Fourier transform by the fast Fourier transform section 35 is supplied to a demodulation section 36 that executes the demodulation process corresponding to the modulation method used on transmission such as the QPSK demodulation to generate a reception symbol stream. The generated reception symbol stream is supplied to a de-interleaver 37 that rearranges the dispersed bit strings to generate reception coded bit strings. The reception coded bit strings are supplied to a Viterbi decoder 38 to carry out Viterbi decoding for demodulation to have reception information bit strings, which are supplied to a reception data processing section 39.

The reception data processing section 39 carries out the process extracting necessary data from the reception packet supplied as reception information bit strings and the error correction process based on the error correction codes, if necessary, to supply the processed data to the memory 40.

The central control unit 41 of the terminal station 30 outputs separated various types of data such as data for respective applications and image data from the reception data stored in the memory 40. Further, the central control unit 41 is coupled to a reception timing control section 42, which instructs about reception timings, signal processing methods or the like at respective circuits based on the control of the central control unit 41.

This processing structure provides a preferable high speed data transmission by wireless transmission between the base station 10 and the terminal station 30. In other words, the wireless transmission by the OFDM modulation averages the bit strings arranged on the sub-carrier in time base and provides an advantageous effect to withstand interference waves such as fading, shadowing, or multipath. In the IEEE802.11a standard, a data transmission rate up to 54 Mps in maximum can be set, so that it can provide data communication at a considerably high data transmission rate than that of 11 Mbps according to the IEEE 802.11b standard.

As various wireless standards have been described such as the IEEE802.11a standard, the IEEE802.11b standard, the Bluetooth, and the IEEE802.11g and the UWB now standardized in the above-described structures, they have different applications for users because these standards have different frequency bandwidths or data transmission rates. The IEEE802.11b standard and the IEEE802.11g standard, having data transmission rates of intermediate level however with broader communication ranges, are suitable for home networks or wireless LANs (Local Area Network) for the outdoor use. However, since terminals other than those for the wireless LAN can use the 2.4 GHz bandwidth, the guarantee of communication is low as, for example, communication cannot be provided even for short-distance, depending on the wireless environment. On the other hand, as the IEEE802.11a standard uses a 5-GHz bandwidth (details in bandwidths depending on countries) requiring carrier sensing, the communication guarantee is higher at a short distance. However, because the used bandwidth is higher than 2.4 GHz, the communicable area is narrower than the LAN using 2.4 GHz bandwidth at the same transmission power. The UWB is defined as a wireless communication standard having spectrum bandwidth of 500 MHz or higher at 1.9 GHz to 10 GHz, for example, thus opening the prospective of permitting realizing rates of a few Gbps at distances within 10 m. A for distances longer than 10 m, such wireless communication currently presents obstacles as for short distances the data transmission rates are high while the transmission range becomes considerably narrow.

Hereafter, optical cables are expected to enter respective homes, and thus if it is assumed that home networks is provided with the wireless networks, increase in transmission speed is be required. Accordingly a higher transmission rate (speed) than that provided with the currently available wireless networks is required. For example, if a communication standard called 100 Base-T is used, and then the wireless transmission of data is transmitted according to the standard, this is sufficiently possible by using two bandwidths in the IEEE802.11g standard or the IEEE802.11a standard and, further, the UWB also presents no problem in this case. However, if a high speed transmission is executed using these methods, there is a certain probability of instability to occur as the gain margin of the wireless link is not large, so that a stable wireless network cannot be provided for exclusively peer to peer communications. Thus, a stable wireless network can be provided only upon having a relayed network provided. Here, an internal structure of a relay terminal station capable of relayed communication is shown in FIG. 8.

Basically, almost all of functional blocks in the schematic diagram are equivalent to those in the base station and terminal station shown in FIG. 7. The different functional block is only the routing table 51. The routing table is a table in which details for executing a change of destination of a packet (rewriting process of an MAC header) is written if the received packet is one for relaying. The process using the routing table 51 will be described later.

The structure of the relay communication station will be described with reference to FIG. 8. An antenna 31 is connected to an RF section 32. The reception signal processed at the RF section 32 is successively supplied to an analog/digital converter 33, a window detection section 34, a fast Fourier transform section 35, a demodulation section 36, a de-interleaver 37, a Viterbi decoder 38, a reception data processing section 39, and the data extracted and processed by the reception data processing section 39 is supplied to a memory 40 to be accumulated.

Out of the reception data accumulated in the memory 40, the central control unit 41 separates the data directed to this communication station into various types of data such as the data suitable for respective applications and image data to output the separated data. Further, the data relayed by this communication station is supplied to a transmission side memory 43 to be accumulated. The accumulated data in the memory 43 is wirelessly transmitted by a processing structure similar to the transmission processing structure at the base station 10 shown in FIG. 7. In other words, the transmission data accumulated in the memory 43 is supplied to the transmission data processing section 44 to execute the MAC process for transmission to provide packet-formatted data. The packet data obtained by the transmission data processing section 44 is subjected to the convolution coding process at a convolution section 45, the interleaving coded bit strings at an interleaver 46, the modulation such as the QPSK modulation at a modulation section 47, and the inverse fast Fourier transform processing and the window processing at an inverse fast Fourier transform section 48 and is supplied to a digital•analog converter 49 to be converted into an analog signal. The converted analog signal is supplied to an RF section 32 to be subjected to analog processes such as filtering and frequency conversion, to wirelessly transmit the frequency-converted signal at the connected antenna 31.

Further, to the central control unit 41, a timing control section 42 is connected. Under the control by the central control unit 41, the timing control section 42 instructs the reception timings and a signal processing method of respective circuits. In addition, the transmission timings, the demodulation method or the like at the circuits from the transmission data processing section 44 to the RF section 32 are also set in accordance with the instruction from the timing control section 42.

In addition, to the central control unit 41 a routing table 51 is connected. If the received packet is a packet for relay, it constitutes a table in which details for executing change of the transmission destination of the packet (MAC header rewriting process). More specifically, as the details of the routing table 51, transmission source IDs and transmission destination IDs are formed in the table corresponding to one another one by one. The central control unit 41 reads out the transmission source ID and then, picks up the to-be-transmitted ID from this table to rewrite the MAC header and transfers it to a transmission processing buffer.

In the case of the conventional wireless relay terminal station as shown in FIG. 8, since the transmission rate is not so high, generally, the rewiring of the MAC header is executed by software. In this case, the central control unit sends all the received packets to the memory controlled by the central control unit (in FIG. 8, the memory is omitted because it is an internal part of the central control unit) irrespective of whether the packet is directed to this station or directed to another station and changes the MAC header using the routing table by the software process at the central control unit if it is a packet to another station.

In Japanese Laid-open patent application No. 7-121455, there is a description of such a type of relay apparatus. However, the relay apparatus described in such applications an example in which relaying is carried out using a wired network.

In order to provide a stable high speed wireless network, the process of rewriting or the like for the MAC header should be executed not at the upper layer, but at the lower layer (the PHY layer, the MAC layer). However, in the case of the wireless communication, since it is controlled by the access method that is more complicated than that for the wired communication, it requires the structure that is more complicated than the architecture of the relay apparatus used in the wired communication. For example, there is a large difference between the wired communication and the wireless communication in that the data receiving side should return a transmission acknowledge (ACK) at the MAC layer or the DLC layer.

The process for returning an ACK in response to the received data is conventionally done by judgment of the received data at the central control unit and by generating an ACK packet based on the control of the central control unit to transmit it, which is a large load of the process and as a factor impeding increasing the process. Upon execution of relaying process, the control unit determines the content of the received data also for the transmission process of the data to be relayed to execute the transmission process to the transmission destination, which shows a serious issue of excessive load to the central control unit as the control means of communication.

Further, in the case of the wireless communication, it is possible that the user receives the packet within the area where the radio wave can reach, however within an area where he/she does not wish to receive the data. Thus, the wireless communication requires a security countermeasure.

However, the execution of the process regarding security at an upper layer extends the relay processing time, so that the throughput decreases.

In consideration of those points, a preferred embodiment of the present invention aims at executing the relaying process for the wireless communication through a high speed however simple control.

According to a preferred embodiment of the present invention, if transmission and reception is executed with relaying a specified packet within wirelessly transmitted data, a header of the received packet is recognized, a destination of the received data is determined based on the recognized header, if the determined destination is not one's own station, the next transmission destination is recognized by looking up a predetermined table, based on the header recognition and the transmission destination recognition, the packet to be relayed is determined, and a packet to be transmitted is selected between the packet determined to be relayed and a packet that an application of one's own station transmits.

Such structure enables to determine which packet is required to be relayed based on the recognition process of the header of the received packet to transmit the determined packet, providing the wireless relay transmission without intervention such as a central control unit.

According to a the preferred embodiments of the present invention, discrimination is made between a packet of (a user's) one's own station and a packet for relay (relay packet), and the processing for the case that the packet is for relay is executed without intervention by a control means such as a central control unit and the like, so that it is possible to construct a wireless network executing the relay processing at a high speed. Further, the complicated process regarding retransmission is executed without a controlling means such as the central control unit to provide a stable wireless network. In addition, the routing table for the relay processing is constantly updated to add to the table the information of the packets of which processes are not executed, to eventually suppress unnecessary processes.

In this case, processing only the packets from the other stations specified using the security information excludes the packets of which receiving processing is not required, in order to provide a countermeasure against harmful behavior intending to decrease the performance of the wireless network as a whole.

BRIEF DESCRIPTION OF THE DRAWINGS

The above and other objects and features of a preferred embodiment of the present invention will become more readily apparent to those of ordinary skill in the art from the following detailed description taken in conjunction with the accompanying drawings in which:

FIG. 3 is an illustration describing an example of a queue table according to a preferred embodiment of the present invention;

DETAILED DESCRIPTION OF THE PREFERRED EMBODIMENTS OF THE PRESENT INVENTION

Hereinafter, preferred embodiments of the present invention will be described with reference to FIG. 1 to FIG. 4.

Figure 1:
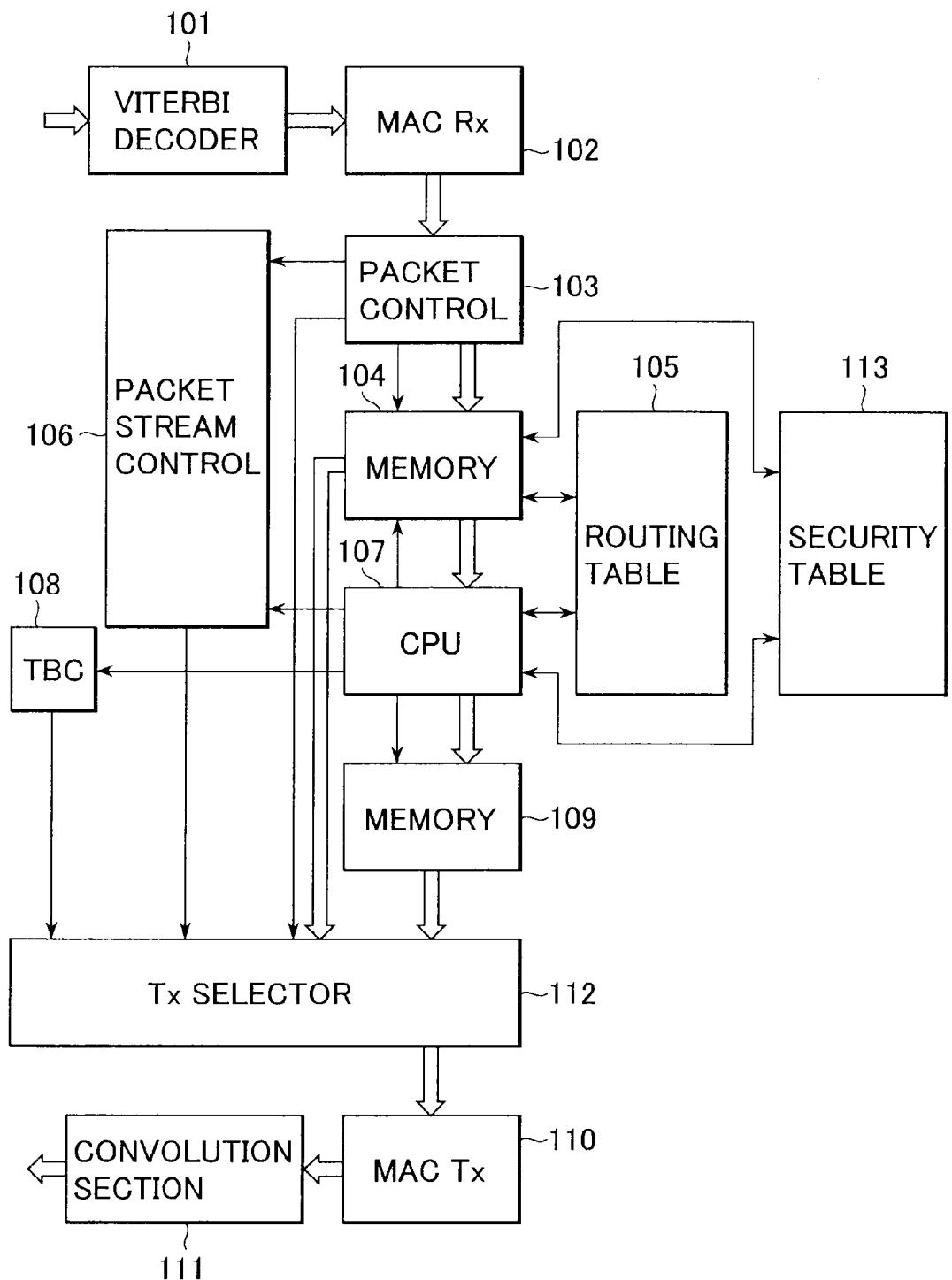
FIG. 1 is block diagram illustrating a structural example of a main part of a wireless communication apparatus according to an embodiment of a preferred embodiment of the present invention.
Figure 8:
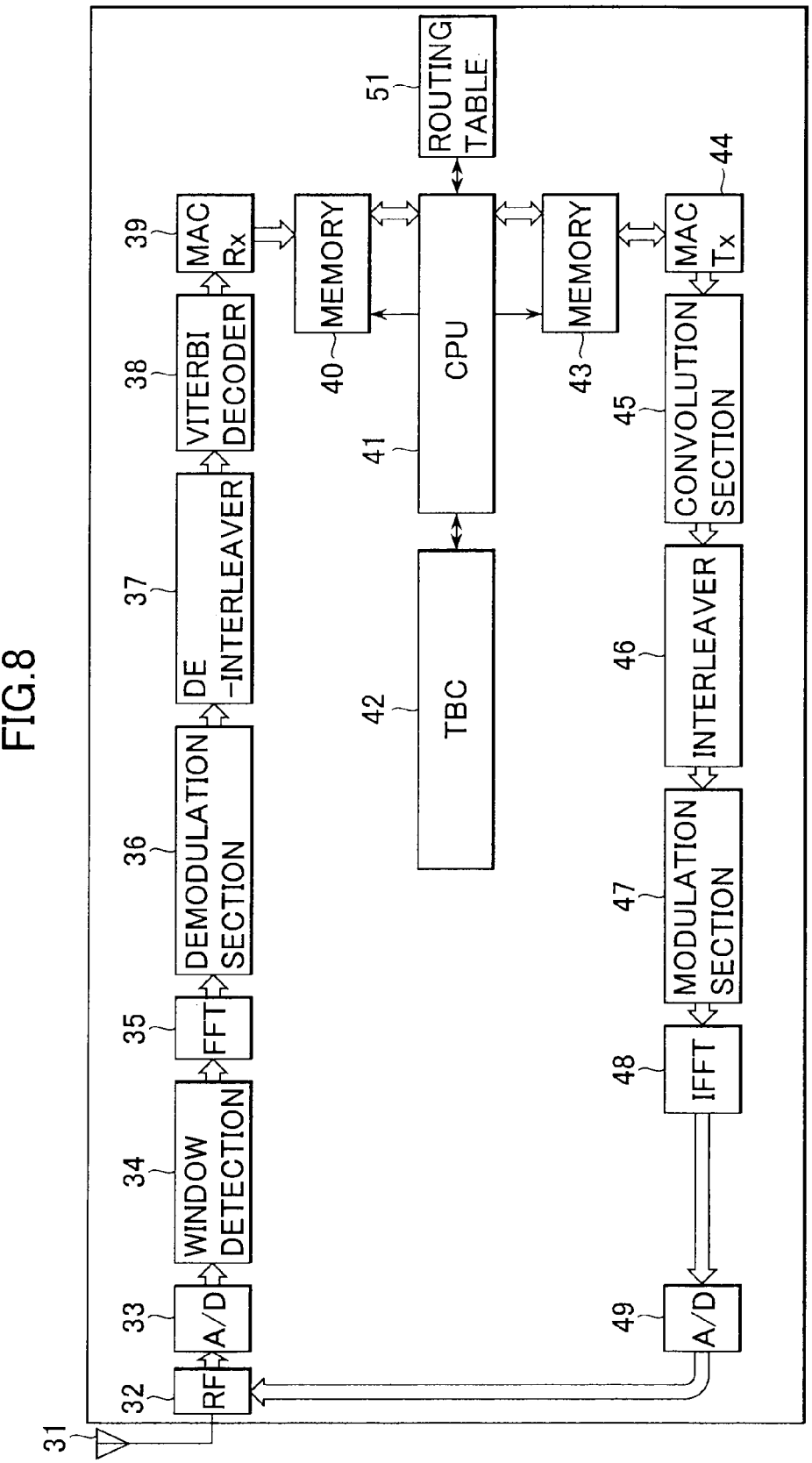
FIG. 8 is a block diagram illustrating a structural example of a conventional wireless communication terminal apparatus.

FIG. 1 is a schematic diagram illustrating a main part of the system structural example of this example. This FIG. 1 shows the processing structure after the Viterbi decoder (corresponding to Viterbi decoder 38 in FIG. 8), before the convolution section in the transmission system (corresponding to 45 in FIG. 8). For the structure from the RF section to the Viterbi decoder in the reception system, and the structure from the convolution section to the RF section in the transmission system, the structure having the same structure shown in FIG. 8 is applicable.

The structure shown in FIG. 1 will be described. The reception information bit strings obtained by Viterbi decoding at the Viterbi decoder 101 are supplied to a reception data processing section 102. The reception data processing section 102 carries out a reception processing in the MAC layer for extracting necessary data and if necessary, an error correction process based on error correction codes. The processed data is supplied to a packet control section 103.

The packet control section 103 determines the MAC header of the received packet to determine the transmission destination. More specifically, if the transmission ID of the received packet is directed to this station, the packet control section 103 transmits it to the central control unit 107 via the reception memory 104. If the transmission source ID is directed to another station, the packet control section 103 determines whether the ID exists in the routing table 105. If the ID exits, it is transmitted to the reception memory 104. If no ID, the packet is deleted. If the packet is directed to another packet, the central control unit 107 is not informed of the reception of the packet. Alternatively, the packet stream control section 106, which controls the transmission data as Queue (Queue), is informed that it is written in the reception memory 104. The packet directed to this station, written in the reception memory 104 is transmitted to the upper layer via the central control unit 107.

The packet control section 106 is a circuit for managing the transmission data as a queue and is controlled for each transmission destination ID.

Further, the packet transmitted from this terminal apparatus is held in the transmission memory 109 under the control of the central control unit 107, and the data held data is sent to a transmission processing section 110 via a transmission selector 112. The transmission selector 112 is a circuit for selecting either of the packet from the upper layer via the central control unit 107 or the packet transmitted from the memory 104, which packet is determined to be relayed by the packet control section 103, based on the queue information managed by the packet stream control section 106 and the information from the timing control section 108 for controlling the transmission. Further, the transmission selector 112 also has a function transmitting to the transmission processing section 110 an acknowledge packet (ACK packet) for the packets directed to this station or other stations (only IDs written in the routing table 105) in the packet control section 103. The ACK packet is previously prepared, for example, in the transmission selector 112 and receives the transmission destination ID information at the transmission timing (actually at a previous timing by a transmission process interval to execute the wireless transmission at the transmission timing) from the timing control section 108.

The transmission selector 112 is triggered in response to the ID information to acquire from the packet stream control section 106 the information indicative of where the data to be transmitted exists. An example of a format of the queue table managed within the packet stream control section 106 is shown in FIG. 3. For example, if a data transmission request for a transmission destination ID=0×03 is received from the timing control section 108, the transmission selector 112 first reads the twelfth data stored in the reception memory 104 in accordance with the queue table shown in FIG. 3, and an address of an MAC header is rewritten in accordance with the routing table 105, and then, the packet is forwarded to the transmission processing section 110.

After transfer, if there is a right of transmission to the transmission destination ID=0×03, the thirteenth packet in the transmission memory 109 is read and forwarded to the transmission processing section 110. Here, either of the packets received from the upper layer in which an MAC header is added or the packet to which no MAC header is added can be forwarded. If the packet is one to which no MAC header is added, an MAC header is added in the transmission selector 112. The packet transmitted from the upper layer (i.e., not the packet to be relayed, but the packet to be transmitted from one's own station) is not subjected to rewriting the MAC header. The packet with the header prepared by the transmission selector 112 is forwarded to the transmission processing section 110.

Figure 2:
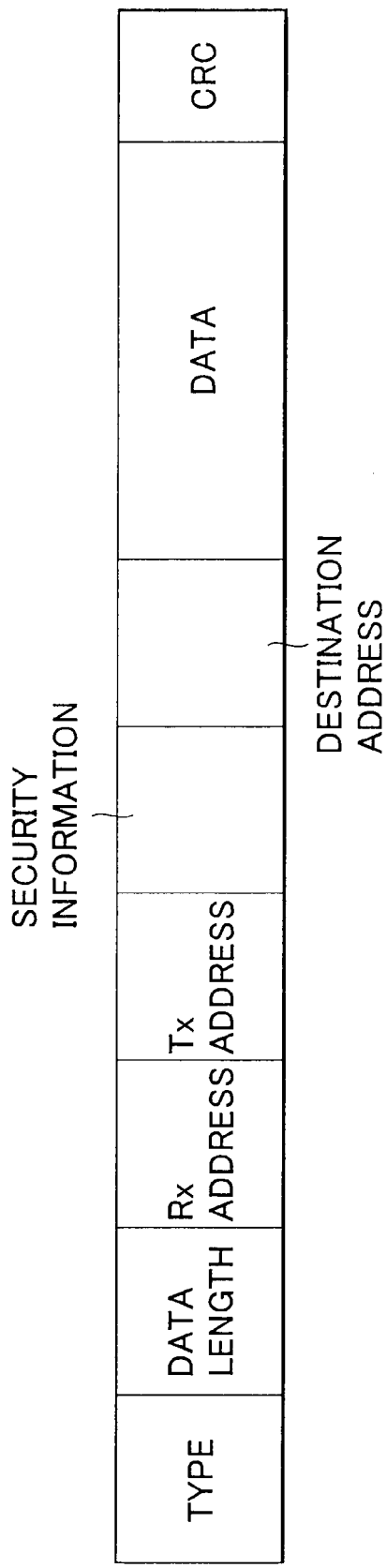
FIG. 2 is an illustration describing an example of a packet structure according to a preferred embodiment of the present invention.

A structural example of the packet wirelessly transmitted by the wireless communication system of this example will be illustrated in FIG. 2. As the MAC header, regions of a packet type, a packet data length, a transmission destination address, a transmission source address, security information, and destination address of data are prepared. Then, data is arranged as payload and finally, CRC (Cyclic Redundancy Check) codes are arranged as error correction codes. The packet structure shown in FIG. 2 is only an example, and thus, the order of arrangement of the regions can be different. Also, other regions might be arranged.

Now turning back to FIG. 1, in this example, a security table 113 is prepared. The security table 113 is a table storing security information for determining whether the packet is received from a terminal (a harmful terminal) other than specified terminals against harmful behavior intending to reduce the performance of the whole of the wireless network by transmitting unnecessary packets. The security table 113 accumulates security information operated from the information at a predetermined region, and upon reception of a packet directed to another person, first it is determined whether it is allowed as a terminal of one's own network. As a specific process for judgment, in this embodiment, as shown in FIG. 2, the region having the security information is prepared in the packet format. A transmission source transmits the security information to a transmission destination as a part of data. As the predetermined regions, here, the transmission destination MAC address and the transmission source MAC address are used.

At first, it is assumed that the terminal added to the network as (the user's) one's own station has a key specific to each terminal. This is called a common key. Thus, a station joined to one's own network at least has keys for terminals at a radio-wave reachable area from its position. A transmission source terminal trying to transmit a packet encrypts the transmission destination MAC address and the transmission source MAC address with the common keys and adds it as the security information to the data as a part of the data to generate and transmit the packet.

On the other hand, the transmission destination having received the packet decrypts the security information from the information of the transmission destination address and the transmission source address using the previously given (by secure communication) common key of the transmission source. Next, it is determined whether the decryption result agrees with the security information received as a part of the data. If no agreement, the received packet is not forwarded to the transmission selector 112, and also no ACK packet is transmitted.

The execution of the process in the communication terminal apparatus having the structure as described above, upon reception of a packet necessary for relaying among the packets received by this communication terminal apparatus, the communication terminal apparatus directly sends the packet from the reception memory 104 to the transmission selector 112, which rewrites the address in the MAC header therein to execute the transmission process. Thus, the central control unit 107 does not intervene in relay-transmission, so that a high speed processing is provided. Further, execution of the process of the security information using the security table 113 excludes the packets of which reception processing by this communication terminal apparatus is unnecessary against the harmful behavior intending to decrease the performance of the whole of the wireless network.

The structure of the wireless communication terminal is not limited to the structure shown in FIG. 1. For example, it is also possible that the arrangement of the packet control section 103 and the reception memory 104 is inversed in order and then, the received packet is once stored in the reception memory to execute the process at the packet control section. Further, the reception memory 104 and the retransmission memory 109 may be physically structured with one memory. Still further, the process (addition or rewriting a header) regarding the MAC header executed by the transmission selector 112 can be executed by the transmission process section 110. In addition, in the transmission selector 112, the process for providing security is not limited to the above-described process. For example, other security methods such as the WEP and the like are applicable. Further, the predetermined regions necessary for execution of the security process are the transmission destination MAC address and the transmission source MAC address. However, they may not be the MAC addresses, but other data such as ID or the like identifiable for the terminal. In addition, previously acquiring the security information based on combination of transmission source addresses and transmission destination addresses provides transfer at a shortened operation interval.

Figure 4:
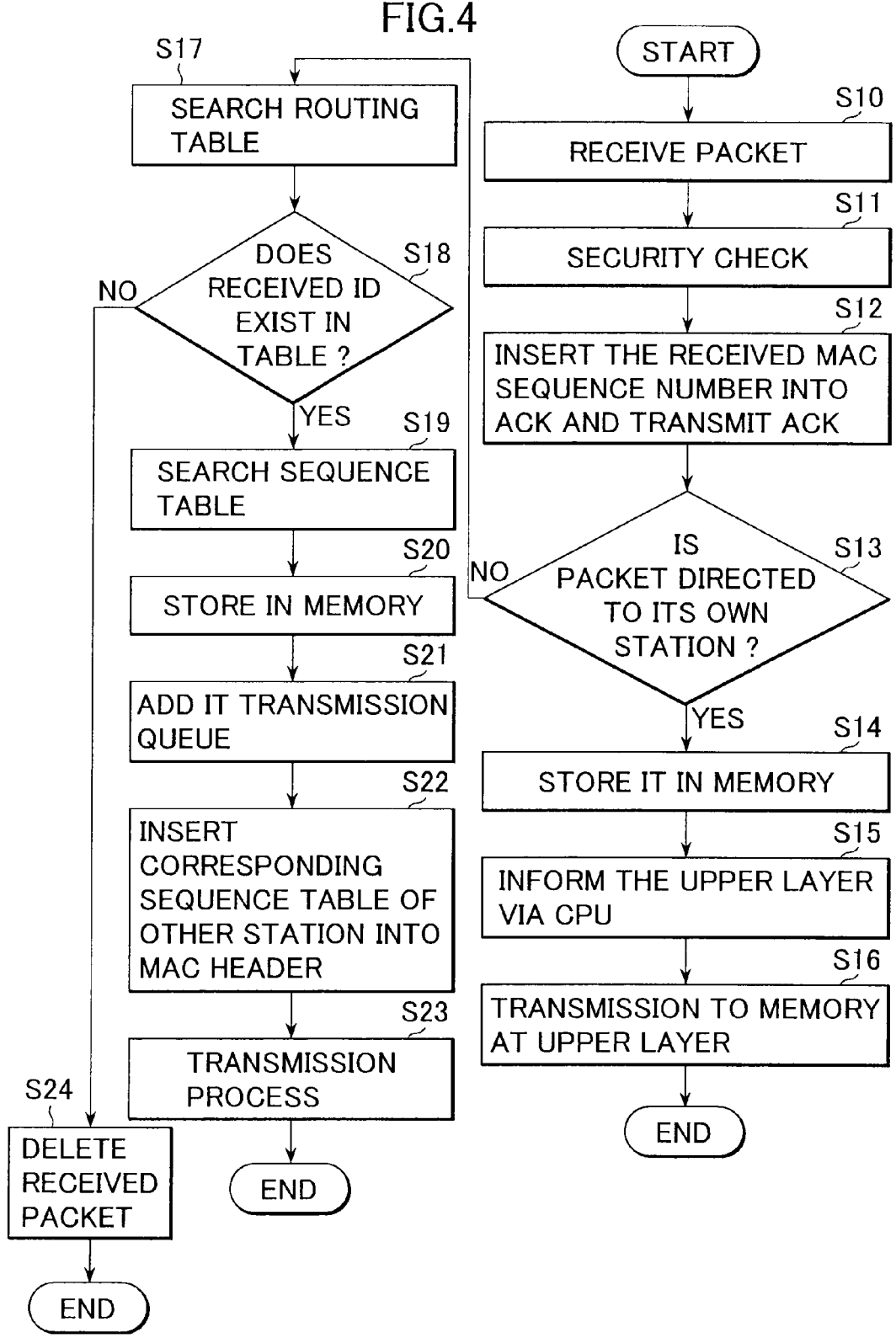
FIG. 4 is a flow chart illustrating an example of a sequence number management process according to an embodiment of a preferred embodiment of the present invention.

Next, an example of communication operation at the wireless terminal apparatus having the structure as described above will be described with reference to the flow chart in FIG. 4. In the wireless communication, it is general that the judgment as to whether retransmission should be executed in accordance with the transmission confirmation with the ACK is carried out at the MAC layer or the DLC layer. The judgment as to whether it reaches the transmission destination is made using the sequence number and the ACK inserted in the MAC header. FIG. 4 shows an example of the operation using these sequence number and the ACK.

Hereinafter, description is made based on the flow chart in FIG. 4. At first, in step S10, the reception process section 102 receives a packet. In step S11, the security check is executed using the stored data in the security table 113. Next, the sequence number written in the MAC header added to the received packet directed to one's own station is inserted into an ACK packet to transmit the ACK packet, in step S12. The packet control section 103, the transmission selector 112, and the transmission process section 110 execute the process for transmission after inserting the sequence number into the ACK packet.

Next, the packet control section 103 determines whether the received packet is directed to one's own station, in step S13. If the packet is directed to one's own station, the packet is stored in the reception memory 104, in step S14. Further, upper layers are informed of reception of the packet via the central control unit 107, in step S15. The central control unit 107 or the upper layers forwards the content stored in the reception memory 104 to a memory of the upper layer, in step S16. The packet control section 103 and the central control unit 107 execute this process.

Further, in step S13, if the packet is not directed to one's own station, the processing proceeds to step S17, where the packet control section 103 searches the routing table 105 to determine whether the packet is to be routed. After this, the packet control section 103 confirms whether the received transmission source ID exists in the routing table, in step S18. If an ID exists, the processing proceeds to step S19, in which is referred the sequence table on which a maximum sequence number is written for each ID to confirm whether it is not a packet that have been received. If the packet that has been received, the processing does not proceed to steps of S20 and beyond.

Next, the received packet is stored in the reception memory 104, in step S20. The packet control section 103 informs the packet stream control section 106 of the reception of the packet to be routed, in step S21. If the timing control section 108 transmits the to-be-routed packet at a transmission timing, the transmission selector 112 writes on the MAC header the sequence number for transmission source ID determined by the routing table 105 (obtained by adding one thereto because the number that has been received is written in the sequence table 105) to add it to the data, in step S22. The packet generated as mentioned above is processed and transmitted at the transmission processing section 110, in step S23.

Further, in step S18, if there is no transmission source ID in the routing table, the packet control section 103 executes a process deleting the corresponding packet, in step S24.

Figure 5:
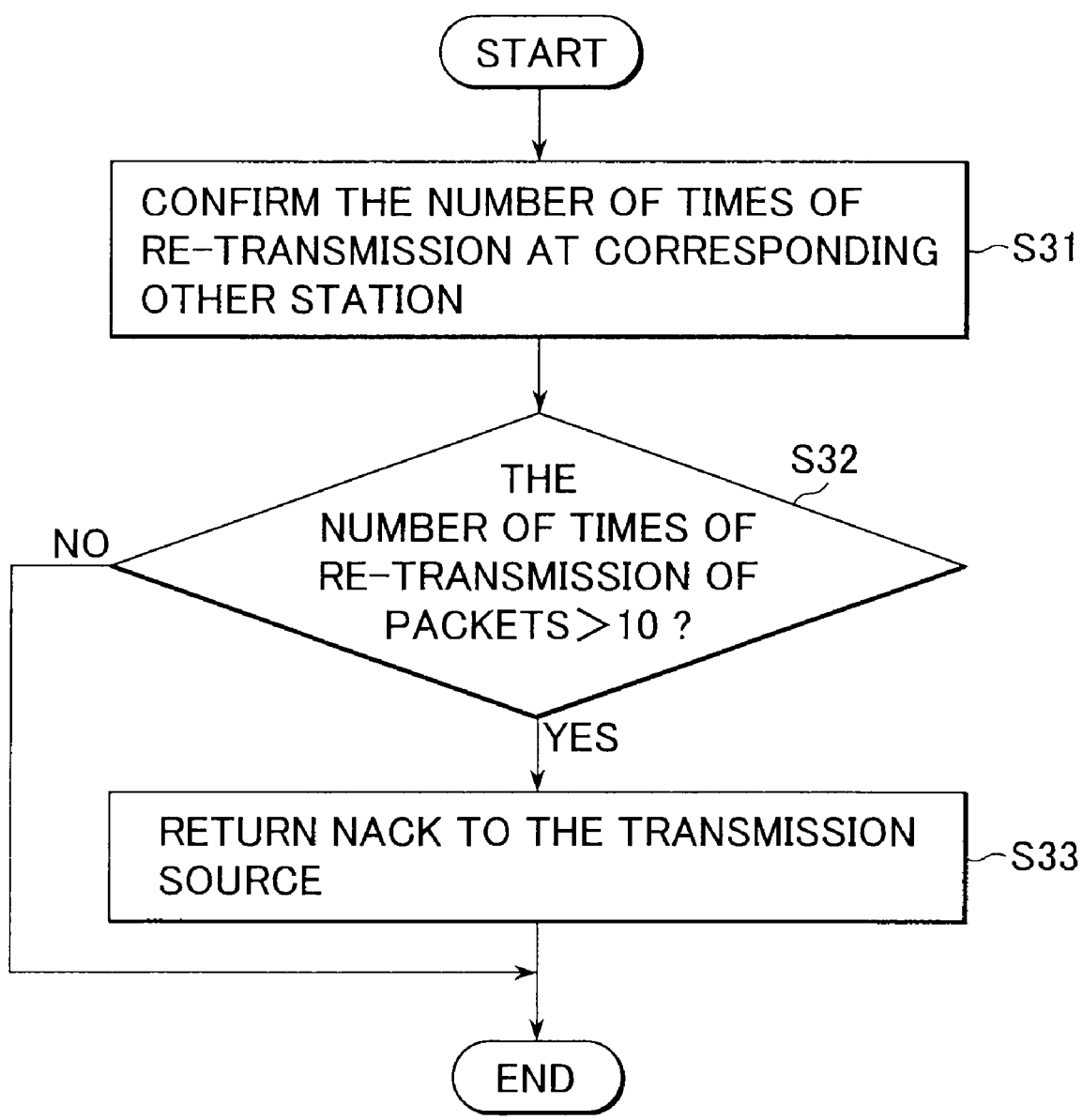
FIG. 5 is a flow chart describing an example of process for the case in which the communication environment for transfer destination is bad, according to a preferred embodiment of the present invention.

In the case where the wireless communication is carried out with transmission of the ACK packets as described above, as the process for the case that the circumstance of communication with the packet destination is bad, the process shown in the flowchart in FIG. 5 may be used. In other words, the number of times of re-transmission from the corresponding other station is confirmed, in step S31. It is determined whether the number of times of retransmission exceeds a predetermined number of times (for example, ten times), in step S32. If the number of times exceeds the predetermined number of times, an NACK packet is returned to the transmission source indicating inability of reception, in step S33.

Further, in the flow chart in FIG. 4, as an additional process in the step S17, for example, a process may be added to inform the central control unit 107 of the ID of the packet newly received. The informed ID is used as information for renewing the routing table 105. In addition, though a terminal is near the station, it may be connected to another network, and thus the term "delete" may be added, in order not to inform the central control unit 107 of the packet received from a terminal of other network every time, like the transmission ID=0×4. Further, it is also possible to have an ID for each use. For example, in the system having first data having a strong real time feature, second data requiring no real time characteristic, and third data for controlling a wireless line, separate IDs may be assigned to the first and second data. No ID is assigned to the third data, and thus, if a packet is received, an ACK is immediately sent back.

In the above-described example, the description was made with assumption that the received sequence number is written in the sequence table. However, it may be a sequence for transmission. Still further, the rewriting and addition process of the MAC header in step S22 may be executed at the transmission processing section 110.

Further, in the description above, the description was made as an apparatus connected to one wireless method of network. However, it may be an apparatus connected to a wireless network having a plurality of types of wireless methods or standards.

For example, it is assumed that a terminal is equipped with the IEEE802.11a system and the IEEE802.11b system. Since the IEEE802.11a system may not be capable of communication at the distance that allows the IEEE802.11b system to execute a peer to peer communication, the use of the IEEE802.11a system, as an alternative path for the IEEE802.11a system, requires preparing a relay apparatus for the IEEE802.11a to provide reach with more than one hop. In other words, in the circumstance in which communication is executed in the IEEE802.11b system, the use of the wireless network assuming the use of relay apparatuses can continue the communication in the IEEE802.11a system though a microwave oven, which may generate interference waves, is turned on.

Figure 6:
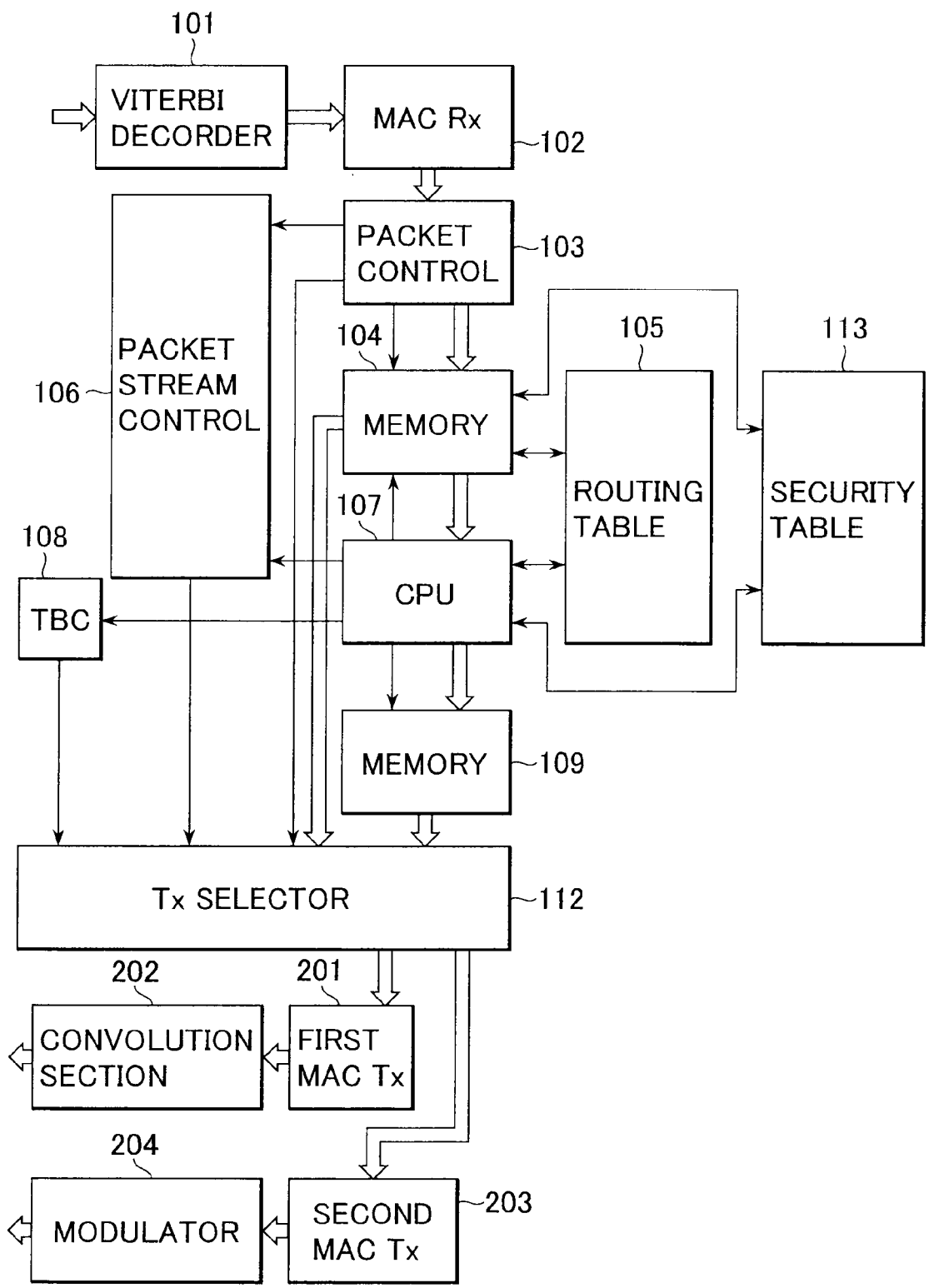
FIG. 6 is a block diagram illustrating a structural example of a main portion of the wireless communication terminal apparatus according to another preferred embodiment of the present invention.
Figure 7:
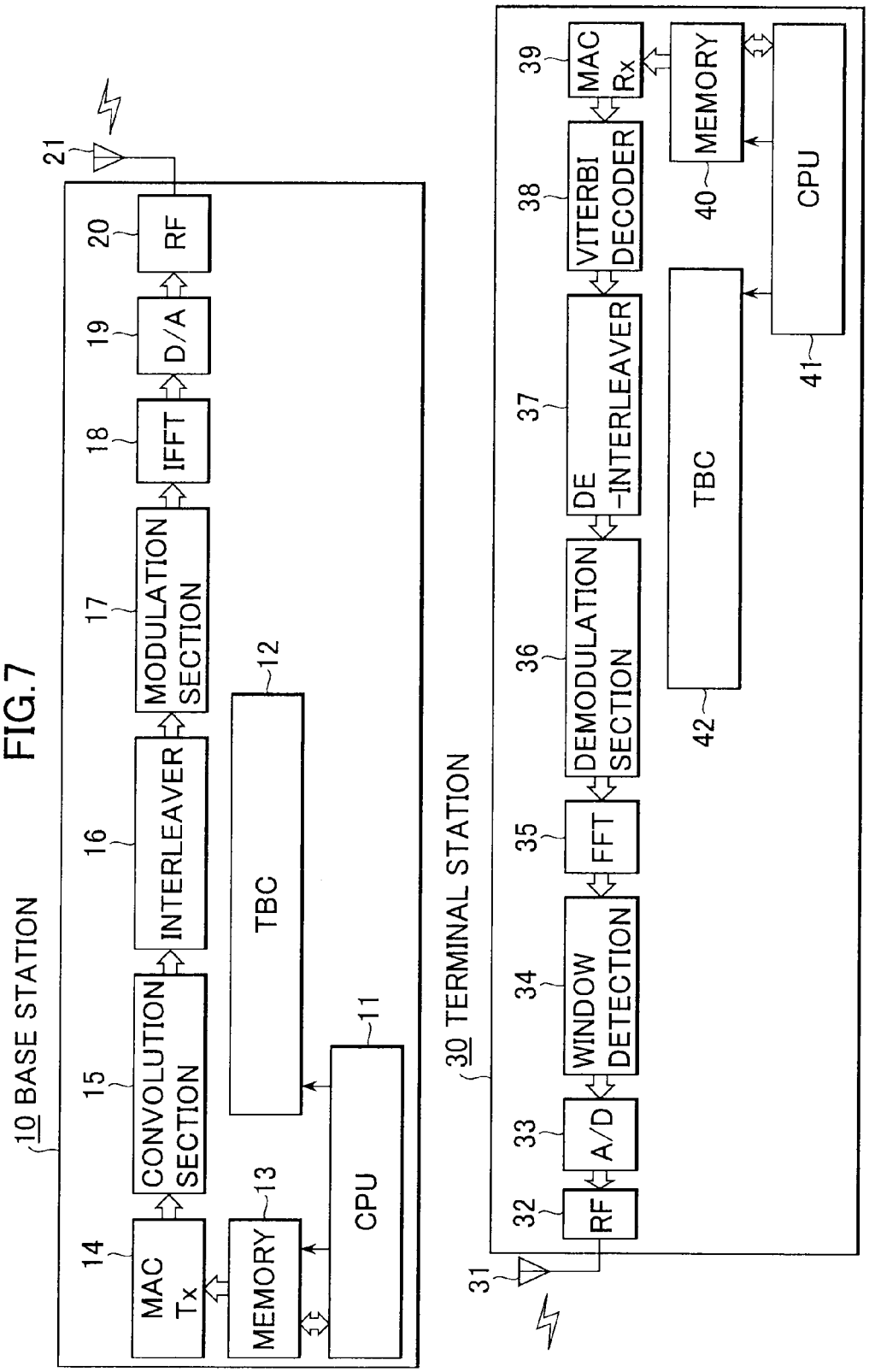
FIG. 7 is a block diagram illustrating an example of conventional wireless transmission and reception structure.

FIG. 6 shows a structural example of a wireless communication terminal connected to such a wireless network using a plurality of wireless systems. In FIG. 6, the receiving and control systems are basically the same as those in structure shown in FIG. 1, and thus the corresponding blocks are designated with the same references. Further in FIG. 6, two sets of transmission systems are connected to the transmission selector 112 in the transmission system. In other words, the first transmission system includes a first transmission processing section 201 and a convolution section 202 for convolution-coding the signal processed by the transmission processing section 201 to wirelessly transmit the output of the convolution section 202 with a known transmission process system. This first transmission system assumes the IEEE802.11a system. The second transmission system includes a second transmission processing section 203 and a modulation section 204 for modulating the signal processed by the transmission processing section 203 to wirelessly transmit the output of the modulation section 204 with a known transmission process system. The second transmission system assumes the IEEE802.11b system. The routing table 105, the packet stream control section 106, and the timing control section 108 are set to control two systems. Further the transmission selector 112 is set to provide a final judgment whether the wireless transmission is to be executed with the first transmission system or the second transmission system. For example, according to the instruction from the timing control section 108 for both, if the right of transmission in the wireless communication system adopting the first transmission system is not established, but the right of transmission can be established in the wireless communication system adopting the second transmission system, the second transmission system executes the transmission process.

Further, FIG. 6 shows a structure in which only the transmission system adopts two communication systems. However, it is also possible to make the structure capable of receiving signals of two communication systems.

In addition, for the case that a transmission system circuit including two wireless communication systems is provided, the two wireless communication systems are not limited to wireless communication apparatuses equipped with the IEEE802.11a and IEEE802.11b systems. For example, it is also provided with combinations of IEEE802.11a standard, the IEEE802.11b standard, the Bluetooth (trade mark) standard, the IEEE802.11g standard, the UWB standard and the like. Further, the number in combination of standards is not limited to two, but may be more than one.

Still further, the judgment or determination at the transmission selector as to which wireless system is used is not limited to the above-described process. For example, it is also possible to determine which one should be selected in accordance with the SN ratio, the error rate, the throughput and the like, of the reception signal.

It is therefore to be noted that the preferred embodiments of the present invention are not limited to the above-mentioned examples of preferred embodiments, so that examples of preferred embodiments of the present invention and equivalents thereof may be appropriately modified, combined, sub-combined, etc., to be implemented within the scope and the spirit of the invention.

What is claimed is:

1. A wireless communication method, implemented by a communication apparatus, for relaying a packet, the method comprising:
   receiving the packet wirelessly;
   identifying a header of the received packet;
   determining a destination of the received packet based on the header;
   recognizing a next transmission destination by looking up a table, if the determined destination is not the communication apparatus itself;
   discriminating sequence numbers of packets determined to be relayed and packets to be transmitted by the communication apparatus itself;
   managing the discriminated sequence numbers;
   if the received packet is renewing the sequence numbers, transmitting a reception completion confirmation packet into which a renewing sequence number is inserted;
   determining a packet to be relayed based on the identifying said header and the recognizing said next transmission destination; and
   neither transmitting the received packet nor a reception completion confirmation packet if the received packet is from a station from which a packet reception is not required, according to a determination according to security information included in the received packet and a security table.

2. The wireless communication method as claimed in claim 1, further comprising:
   transmitting the reception completion confirmation packet to a packet transmission source if the received packet has no error.

3. The wireless communication method as claimed in claim 1, further comprising:

selecting a method of communication and transmitting a packet under the selected method of communication, if relaying is possible under more than one method of communication.

4. The wireless communication method as claimed in claim 1, wherein retransmission of the packet is executed without a processing unit.

5. A wireless communication apparatus for relaying a packet, the apparatus comprising:
   a reception unit that receives the packet wirelessly;
   a header recognition section that recognizes a header included in the packet received by the reception unit;
   a packet determining section configured to determine whether the packet received by the reception unit is directed to the wireless communication apparatus itself;
   a table to recognize a next transmission destination based on a destination of the packet received by the reception unit;
   a relay station packet determining section configured to determine a packet to be relayed through the table and the header recognition section;
   a sequence number management section configured to determine sequence numbers of the packet to be relayed by the reception unit and the packet determined by the packet determining section and to manage the determined sequence numbers, wherein a reception completion confirmation packet into which an updated sequence number is inserted is transmitted by the wireless communication apparatus, if the sequence number management section detects whether the received packet is one in which a sequence number is to be updated; and
   a security table to store security data for a recognition of a communication counterpart, wherein the header recognition section neither transmits the corresponding packet from the wireless communication apparatus nor a reception completion confirmation packet, if the received packet is from a station from which a packet reception is not required as determined by security information included in the received packet and information stored in the security table.

6. The wireless communication apparatus as claimed in claim 5, wherein the wireless communication apparatus transmits the reception completion confirmation packet to a transmission source of the received packet if the packet to be relayed, received by the reception unit and determined by the relay station packet determining section, has no data error.

7. The wireless communication apparatus as claimed in claim 5, further comprising:
   a first transmission unit according to a first method of communication; and
   a second transmission unit according to a second method of communication, wherein a packet is transmitted upon a selection of either the first or the second transmission unit based on a transmission destination determined by the relay station packet determining section.

8. The wireless communication apparatus as claimed in claim 5, further comprising:
   a packet data processing section that processes a packet if the packet determining section determines that the packet is of the wireless communication apparatus itself.

* * * * *